(12) United States Patent
Park et al.

(10) Patent No.: US 9,316,304 B2
(45) Date of Patent: Apr. 19, 2016

(54) SHIFTING APPARATUS FOR VEHICLE

(71) Applicant: Hyundai Motor Company, Seoul (KR)

(72) Inventors: Han Gil Park, Suwon-si (KR); Ki Young Song, Seoul (KR); Chang Hyun Lee, Seoul (KR); Yang Rae Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 64 days.

(21) Appl. No.: 14/464,506

(22) Filed: Aug. 20, 2014

(65) Prior Publication Data

US 2015/0135878 A1    May 21, 2015

(30) Foreign Application Priority Data

Nov. 18, 2013  (KR) .................. 10-2013-0139738

(51) Int. Cl.
| | |
|---|---|
| *B60K 20/00* | (2006.01) |
| *G05G 9/00* | (2006.01) |
| *F16H 59/02* | (2006.01) |
| *F16H 59/10* | (2006.01) |
| *G05G 1/00* | (2008.04) |

(52) U.S. Cl.
CPC ........ *F16H 59/0204* (2013.01); *F16H 59/0278* (2013.01); *F16H 59/105* (2013.01); *F16H 2059/026* (2013.01); *F16H 2059/0221* (2013.01); *F16H 2059/0295* (2013.01); *G05G 1/00* (2013.01); *Y10T 74/20104* (2015.01); *Y10T 74/20159* (2015.01)

(58) Field of Classification Search
CPC .................. F16H 2061/0223; F16H 2061/226; F16H 2059/048; F16H 2061/168; F16H 59/105; F16H 59/12; F16H 2059/0239; F16H 2061/0248; F16H 59/0204; F16H 2059/0221; F16H 2059/0295; F16H 63/3458
USPC ............................................... 701/66
See application file for complete search history.

(56) References Cited

U.S. PATENT DOCUMENTS

| | | | | |
|---|---|---|---|---|
| 5,816,100 | A * | 10/1998 | Fowler | F16H 59/02 116/28.1 |
| 8,323,153 | B2 | 12/2012 | Deblack et al. | |
| 2003/0172762 | A1* | 9/2003 | Ehrmaier | F16H 59/0204 74/473.33 |

(Continued)

FOREIGN PATENT DOCUMENTS

| | | |
|---|---|---|
| JP | 2003-34159 A | 2/2003 |
| JP | 2005-7993 A | 1/2005 |

(Continued)

*Primary Examiner* — William Kelleher
*Assistant Examiner* — Jake Cook
(74) *Attorney, Agent, or Firm* — Morgan, Lewis & Bockius LLP

(57) ABSTRACT

A shifting apparatus for a vehicle may include a lever position guide that is provided inside a gear lever box at which a gear lever is located, and has a reference position and multiple gear positions connected to the reference position, an elastic part engaged to the gear lever and the gear lever box and configured to return the gear lever to the reference position when the gear lever deviates from the reference position and thus is located at any one of the multiple gear positions, and a controller that shifts a gear range according to a preset shifting order when the gear lever moves between the reference position and the multiple gear positions, and shifts the gear range to a preset gear range when the gear lever is located at any one of the multiple gear positions for a longer time than a setting time.

15 Claims, 1 Drawing Sheet

(56) References Cited

U.S. PATENT DOCUMENTS

| | | | |
|---|---|---|---|
| 2011/0132122 A1* | 6/2011 | Park | F16H 59/0204 74/473.12 |
| 2011/0132124 A1* | 6/2011 | Park | F16H 59/0204 74/473.18 |
| 2012/0271488 A1 | 10/2012 | You | |
| 2012/0291579 A1* | 11/2012 | Kamoshida | F16H 59/0204 74/473.3 |

FOREIGN PATENT DOCUMENTS

| | | |
|---|---|---|
| JP | 2008-2561 A | 1/2008 |
| KR | 10-2011-0062888 A | 6/2011 |
| KR | 10-2012-0119231 A | 10/2012 |
| WO | WO 2008/035126 A1 | 3/2008 |
| WO | WO 2012/176316 A1 | 12/2012 |

\* cited by examiner

SHIFTING APPARATUS FOR VEHICLE

CROSS REFERENCE TO RELATED APPLICATION

The present application claims priority of Korean Patent Application Number 10-2013-0139738 filed on Nov. 18, 2013, the entire contents of which is incorporated herein for all purposes by this reference.

BACKGROUND OF THE INVENTION

1. Field of the Invention

The present invention relates to a shifting apparatus for a vehicle, capable of sustaining a neutral range when the vehicle is parked.

2. Description of Related Art

Shift-by-wire (SBW) shifting systems refer to electronic gear lever systems capable of electronically changing a gear range on the basis of a conventional automatic transmission shifting system that is generally used at present.

In the conventional automatic transmission shifting system, a driver directly operates a gear lever in the order of P-R-N-D-3-2-1 to designate a gear range of a vehicle. However, in the electronic gear lever system that has recently been applied to several types of vehicles, once the driver moves the gear lever forward or backward once or twice witch the gear lever located at a designated position at all times, a gear lever controller changes the gear range according to a preset order of the gear range. For example, it is assumed that the gear range ordered P-R-N-D is set for the gear lever controller, and that a current gear range is the N range. When the driver moves the gear lever forward once, the N range is shifted to the R range. When the driver moves the gear lever backward once, the N range is shifted to the D range.

Meanwhile, the electronic gear lever system is separately provided with buttons for performing several special functions. The buttons include a P LOCK button for performing easy P range shifting. When the driver pushes the P LOCK button, the gear range of the vehicle is shifted to the P range without moving the gear lever. Further, the buttons include a P RELEASE button so as to allow parking of the N range of the vehicle. When the driver pushes the P RELEASE button in a state of the P range of the vehicle, the transmission releases the P range, and shifts the P range to the N range so as to enable the parking of the N range.

However, the parking of the N range as described above is possible only when the P RELEASE button is separately provided. As such, additional expenses caused by providing the P RELEASE button, i.e. expenses for waterproofing the P RELEASE button and improving reliability of the P RELEASE button, are inevitably increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shifting apparatus for a vehicle, allowing neutral range parking based on a preset operation of a gear lever without a separate button for the neutral range parking.

In an aspect of the present invention, a shifting apparatus for a vehicle may include a lever position guide that is provided inside a gear lever box at which a gear lever is located, and has a reference position at which the gear lever box is located and multiple gear positions connected to the reference position so as to allow a movement of the gear lever; an elastic part that is engaged to the gear lever and the gear lever box and is configured to return the gear lever to the reference position when the gear lever deviates from the reference position and thus is located at any one of the multiple gear positions; and a controller that shifts a gear range according to a preset shifting order when the gear lever moves between the reference position and the multiple gear positions, and shifts the gear range to a preset gear range when the gear lever is located at any one of the multiple gear positions for a longer time than a setting time.

The reference position includes a first reference position and a second reference position, both of which are connected to each other, wherein at least one of the gear positions is provided in a forward direction of the first reference position, and wherein at least one of the gear positions is provided in a backward direction of the second reference position.

A first gear position is provided in the forward direction of the first reference position, and a second gear position is provided in the backward direction of the second reference position, wherein the first gear position, the first reference position, the second reference position, and the second gear position are disposed in series from the forward direction to the backward direction.

The gear lever is configured to return to the first reference position when moving to the first gear position, and the gear lever is configured to return to the second reference position when moving to the second gear position.

The preset shifting order is a reverse range, a neutral range, and a drive range.

The controller shifts the gear range to the neutral or reverse range when the gear lever moves in the forward direction, and to the neutral or drive range when the gear lever moves to the backward direction.

The preset gear range is a neutral range.

The shifting apparatus may further include a gear range detector detecting a current gear range of the vehicle, wherein the controller allows the current gear range to be shifted to the neutral range when the detected current gear range is a park range.

The controller allows the current gear range to be shifted to the neutral range when a brake signal is applied to the vehicle.

The controller allows the current gear range to be shifted to the neutral range only when an engine of the vehicle is cut.

The setting time is at least two seconds.

The controller shifts the current gear range to the neutral range when the gear lever is located at the gear position farthest from the first reference position in the forward direction.

The controller shifts a current gear range to the neutral range when the gear lever is located at the gear position farthest from the second reference position in the backward direction.

The gear lever includes an unlock button that is operated to unlock the gear lever so as to allow the movement of the gear lever, and the controller shifts the current gear range to the neutral range when the gear lever is located at any one of the gear positions for a longer time than a setting time in a state in which an unlock signal of the gear lever is applied.

The controller shifts a current gear range to the neutral range when the gear lever is located at any one of the gear positions for a longer time than a setting time in the state in which an engine of the vehicle is cut, in which the current gear range is the park range, in which a brake signal is applied, and in which an unlock signal of the gear lever is applied.

According to the shifting apparatus for a vehicle which has the structure as described above, the neutral parking is made possible only by the movement of the gear lever without the neutral parking button, costs and the number of working processes can be reduced.

Further, it is possible to prevent the neutral parking from being made impossible by damage to the neutral parking button.

In addition, another operating button can be provided at the position at which the neutral parking button is located, it is possible to improve a function and design.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
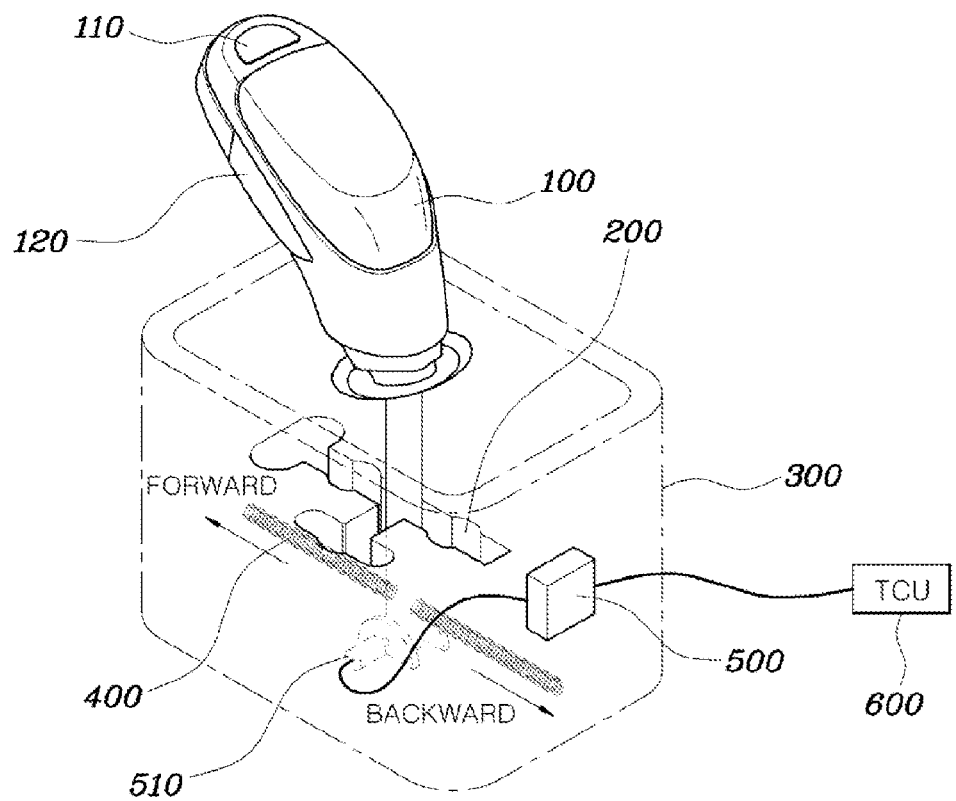
FIG. 1 shows a configuration of a shifting apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, an exemplary embodiment of the present invention will be described in detail with reference to the accompanying drawings.

FIG. 1 shows a configuration of a shifting apparatus for a vehicle according to an exemplary embodiment of the present invention. A shifting apparatus for a vehicle includes: a lever position guide 200 that is provided inside a gear lever box 300 at which a gear lever 100 is located, and has a reference position C0 at which the gear lever box 300 is located and multiple gear positions D connected to the reference position C0 so as to allow movement of the gear lever 100, an elastic part 400 that returns the gear lever 100 to the reference position C0 when the gear lever 100 deviates from the reference position C0 and is located at any one of the multiple gear positions D, and a controller 500 that shifts a gear range according to a preset shifting order when the gear lever 100 moves between the reference position C0 and the multiple gear positions D, and shifts the gear range to a preset gear range when the gear lever 100 is located at any one of the multiple gear positions D for a longer time than a setting time.

In detail, the gear lever box 300 is a place in which the gear lever 100 is inserted and installed, and is mounted with the lever position guide 200 and the elastic part 400. The controller 500 is also installed in the gear lever box 300, or may be separately provided outside. The gear lever box 300 is typically provided between a driver's seat at which the gear lever 100 is located and a passenger's seat, but not necessarily limited thereto.

Further, the elastic part 400 is preferably installed in the gear lever box 300 in parallel with a shift path of the gear lever 100 of the lever position guide 200. The elastic part 400 is formed of a set of springs, which are installed on forward and backward sides of the gear lever 100 respectively. The elastic part 400 allows the gear lever 100 to be always located at the reference position C0 by an elastic force acting on the both sides. Alternatively, the elastic part 400 may be replaced with a driving motor that allows the gear lever 100 to be always located at the reference position C0 when the gear lever 100 is located at any one of the multiple gear positions D.

In addition to this configuration, the elastic part 400 may have various modifications.

One end of the gear lever 100 is rotatably fixed to the bottom of the gear lever box 300 by a hinge pin. The lever position guide 200 is located at the middle of the gear lever 100. In addition to this configuration, the gear lever 100 may be slidably coupled to the bottom of the gear lever box 300 without being rotatably fixed to the bottom of the gear lever box 300, so that the gear lever 100 can move along the shift path of the gear lever 100 of the lever position guide 200. The method of fixing the gear lever 100 may have various modifications.

Further, the shifting apparatus may further include a position sensor 510 that is coupled to a lower end of the gear lever 100, detects at which position of the lever position guide 200 the gear lever 100 is located at present, and sends position information to the controller 500. The position sensor 510 may detect an angle of rotation of the gear lever 100, thereby detecting at which position of the lever position guide 200 the gear lever 100 is located at present.

Meanwhile, the reference position C0 is made up of a first reference position C1 and a second reference position C2, both of which are connected to each other. At least one of the gear positions is provided in the forward direction of the first reference position C1. At least one of the gear positions is provided in the backward direction of the second reference position C2.

The second reference position C2 is preferably connected in the backward direction of the first reference position C1. When located at one of the first reference position C1 and the second reference position C2, the gear lever 100 continues to be fixed to the finally located reference position without returning to another reference position.

For example, when the gear lever 100 is finally located at the first reference position C1, the gear lever 100 continues to be located at the first reference position C1 without moving to the second reference position C2.

As for the gear position, a first gear position a is provided in the forward direction of the first reference position C1, and a second gear position b is provided in the backward direction of the second reference position C2. In detail, one gear position D is provided in the forward direction of the first reference position C1, and one gear position D is provided in the backward direction of the second reference position C2. This is because a total of four positions, i.e. the two reference positions C0 and the two gear positions D, are provided, and a reverse range, a neutral range, a drive range, and a park range can all be shifted using the four positions. Since only the four positions are provided, it is possible to prevent an increase in size of the gear lever box 300. A detailed shifting process will be described below.

Further, when the gear lever 100 moves to the first gear position a, the gear lever 100 returns to the first reference position C1. When the gear lever 100 moves to the second gear position b, the gear lever 100 returns to the second reference position C2.

When the gear lever 100 is located at any position of the lever position guide 200, gears of the vehicle are shifted. Whenever the gear lever 100 moves from one reference position C0 to another reference position C0, and from the reference position C0 to the gear position D, the gears are shifted according to the shifting order. Further, the shifting apparatus may further include a gear range detector that detects a current gear range of the vehicle so as to be able to determine to which gear range a current gear range is shifted next in the event of the movement of the gear lever 100 and send a control signal to a transmission control unit (TCU) 600 to allow the gears of a transmission to be shifted.

Here, the shifting order is the reverse range, the neutral range, and the drive range. The park range is adapted to be shifted when a separate parking button 110 provided for the gear lever 100 is pushed. In detail, when shifted to the park range, the gear lever 100 is located at a currently located reference position C0 without any movement. Preferably, when the gear lever 100 moves to one position in the backward direction, the gear range is shifted to the drive range. When the gear lever 100 moves to one position in the forward direction, the gear range is shifted to the reverse range.

Further, when the gear lever 100 moves in the forward direction, the controller 500 shifts the gear range to the neutral or reverse range. When the gear lever 100 moves in the backward direction, the controller 500 shifts the gear range to the neutral or drive range. A detailed shifting process will be described below.

Hereinafter, the moving and shifting processes of the gear lever 100 will be described in greater detail with reference to FIG. 2.

Figure 2:
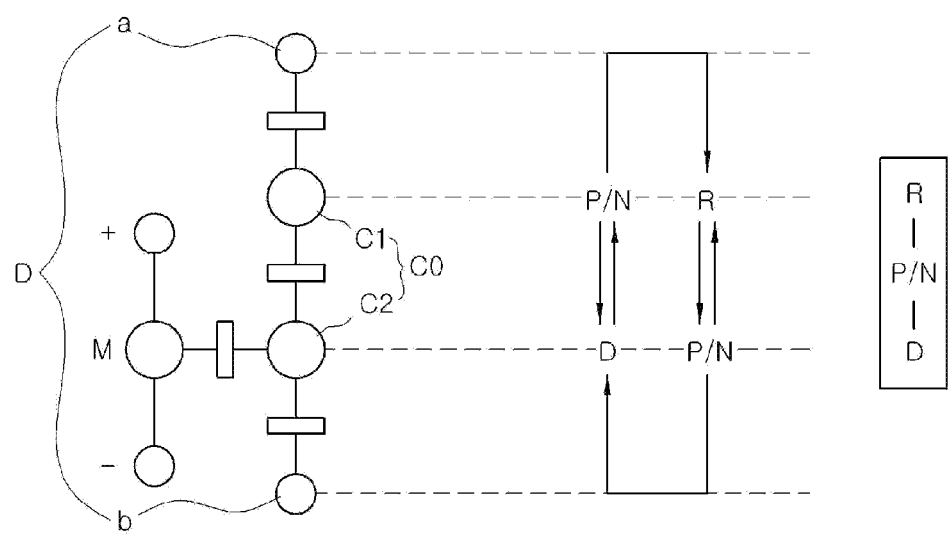
FIG. 2 shows a lever position guide of the shifting apparatus for a vehicle according to the exemplary embodiment of the present invention.

FIG. 2 shows the lever position guide 200 of the shifting apparatus for a vehicle according to the exemplary embodiment of the present invention. The reference position has the first reference position C1 and the second reference position C2. The lever position guide 200 has the first gear position a that is one gear position connected in the forward direction of the first reference position C1, and the second gear position b that is one gear position connected in the backward direction of the second reference position C2.

When the gear lever 100 is located at the first reference position C1 in a current state of the park range (hereinafter referred to as "P range"), the driver moves the gear lever 100 to the second reference position C2 in order to shift the gear range to the drive range (hereinafter referred to as "D range") in the order of the reverse range (hereinafter referred to as "R range"), the neutral range (hereinafter referred to as "N range"), and the D range. Afterwards, to shift the gear range to the N range again, the driver moves the gear lever to the first reference position C1. If the driver pushes the parking button 110 with the gear range shifted to the D range of the second reference position C2, the gear range is only shifted to the P range with the gear lever 100 located at the second reference position C2. If the driver pushes the parking button 110 with the gear lever 100 located at the first reference position C1, the gear range is only shifted to the P range with the gear lever 100 located at the first reference position C1.

When the gear lever 100 is located at the first reference position C1, and when the gear range is the N range, the gear lever 100 should move to the first gear position a in order to shift the gear range to the R range. In this case, the gear range is shifted to the R range, and the gear lever 100 directly returns from the first gear position a to the first reference position C1.

When the gear range is shifted to the N range again, the gear lever 100 moves from the first reference position C1 to the second reference position C2. Afterward, when the gear lever 100 moves to the second gear position b in order to shift the gear range to the D range, the gear range is shifted to the D range, and the gear lever 100 returns from the second gear position b to the second reference position C2 by means of the elastic part 400.

When the gear range is shifted to the N range from the P range, it is not necessary to separately operate the gear lever 100, and the gear range can be preferably directly shifted to the D range by the movement of the gear lever 100. Alternatively, the gear range may be adapted to be shifted to the P range after being shifted to the D or R range and the N range by pushing the parking button 110.

As described above, when the gear lever 100 is located at any one of the multiple gear positions D for a longer time than a setting time, the controller 500 preferably shifts the gear range to a preset gear range.

Here, the preset gear range is the N range, and the setting time is equal to or more than two seconds.

As described above, the reason the gear range can be shifted to the N range only by the movement of the gear lever 100 is intended for neutral parking when the vehicle is parked.

To be more specific, in the related art, a neutral parking button for the neutral parking of the vehicle is separately provided for the gear lever box 300. Only when the neutral parking button is pushed, the gear range is shifted to the N range. However, as described above, since the gear range can be shifted to the N range only by the movement of the gear lever 100 without the separate neutral parking button, it is possible to reduce expenses caused by providing the neutral parking button.

The N range of the controller 500 will be described by way of example. It is assumed that the gear lever 100 is located at the first reference position C1 at present. If the driver wants the neutral parking of the vehicle, the driver moves the gear lever 100 to the first gear position a in the forward direction, and does not immediately release the gear lever 100, but continues to hold the gear lever 100 under pressure so that the gear lever 100 is located at the first gear position a for a setting time. The controller 500 recognizes that the gear lever 100 does not yet return to the first reference position C1 in spite of elapse of a time to return to the first reference position C1 again, and determines that the driver wants the neutral parking at present, thereby shifting the gear range to the N range.

Here, regardless of which gear range the current gear range is, when the gear lever 100 stays at the first gear position a or the second gear position b for two seconds or more, the gear range is adapted to be able to be shifted to the N range. However, when the gear range is the D range or the R range, the vehicle is typically in a driving state. Even in this case, the gear range can be shifted to the N range by the movement of the gear lever 100 once. As such, it is not necessary to shift the gear range to the N range on the foregoing mode. Further, when the gear lever 100 stays at the first gear position a or the second gear position b for two seconds or more due to an unskillful operation of the driver or accidental application of an external force in an unrecognized state of the driver while the vehicle is driven, the gear range may be abruptly shifted to the N range although the driver does not want to do so.

Therefore, only when the current gear range is the P range, and when the gear lever 100 stops at any one of the multiple gear positions D for a longer time than a setting time, the controller 500 preferably allows the current gear range to be shifted to the N range. In other words, it is checked by the gear range detector whether or not the current gear range is the P range. As a result, only when the current gear range is the P range, the gear range can be shifted to the N range.

Further, when the gear range is shifted to the N range, a drive shaft may be abruptly unlocked, and thus the vehicle may be pushed forward or backward along a slope to cause an accident. To prevent this accident, only when a brake signal is applied to the vehicle, the controller 500 is adapted to allow the current gear range to be shifted to the N range.

Here, the brake signal is a brake pedal operation signal. When the driver steps on a brake pedal, it is determined that the brake signal is applied. Only when the brake signal is applied, the current gear range is adapted to be able to be shifted to the N range.

Further, only when an engine of the vehicle is cut, the controller 500 is adapted to allow the current gear range to be shifted to the N range. This is to make possible the shift to the N range as described above only when the vehicle is parked. Thereby, the shift to the N range which the driver does not want during the driving does not occur.

Meanwhile, the gear lever 100 is provided with an unlock button 120 that is operated to unlock the gear lever 100 so as to allow the movement of the gear lever 100. When the gear lever 100 is located at any one of the gear positions for a longer time than a setting time in a state in which an unlock signal of the gear lever 100 is applied, the controller 500 allows the current gear range to be shifted to the N range.

This is also to prevent the shift to the N range which the driver does not want. For the purpose of the shift to the R range, the driver may move the gear lever 100 to the first gear position a, and fix the gear lever 100 to the first gear position a for a while without immediately releasing the gear lever 100. As such, in this case, the driver wants the shift to the R range rather than the neutral parking. Thus, to accurately determine whether nor not the driver makes a demand for the neutral parking, the driver locates the gear lever 100 at any one of the gear positions for a longer time than a setting time while pushing the unlock button 120, as described above. Only in this case, the gear range is adapted to be able to be shifted to the N range.

As described above, in the state in which the current gear range is the P range, in which the brake signal is applied, and in which the unlock signal of the gear lever 100 is applied, when the gear lever 100 is located at any one of the gear positions D for a longer time than a setting time, the controller 500 preferably causes the current gear range to be shifted to the N range.

In other words, in the state in which the current gear range is the P range, in which the brake signal is applied, or in which the unlock signal of the gear lever 100 is applied, when the gear lever 100 is located at any one of the gear positions D for a longer time than a setting time, the current gear range is set to be shifted to the N range. Thereby, restricting factors of the shift to the N range as described above may be independently applied, but are all applied en bloc. As a result, after it is definitely checked that the driver wants the neutral parking at present, the gear range is adapted to be able to be shifted to the N range.

Meanwhile, when the gear lever 100 is located at the gear position farthest from the first reference position C1 in the forward direction, the controller 500 can shift the current gear range to the N range. Further, when the gear lever 100 is located at the gear position D farthest from the second reference position C2 in the backward direction, the controller 500 can shift the current gear range to the N range.

In this case, in addition to the first gear position a and the second gear position b, one or more gear positions are further provided in the forward direction of the first gear position a, and one or more gear positions are further provided in the backward direction of the second gear position b. For example, a third gear position is further provided in the forward direction of the first gear position a, and a fifth gear position is further provided in the forward direction of the third gear position. A fourth gear position is further provided in the backward direction of the second gear position b, and a sixth gear position is further provided in the forward direction of the fourth gear position. In this case, when the gear lever 100 is located at the fifth or sixth gear position for a longer time than a setting time, the controller 500 shifts current gear range to the N range.

As described above, the reason to do so is as follows. If the controller 500 shifts current gear range to the N range when the gear lever 100 is located at the third or fourth gear position for a longer time than a setting time, it is difficult for the driver who operates the gear lever 100 to check at which gear position D the gear lever 100 is located at present, and to clearly recognize at which point the gear lever 100 is located between the first reference position C1 and the fifth gear position, and thus the driver may suffer much inconvenience during the neutral parking.

However, as described above, when the gear lever 100 is located at the fifth or sixth gear position for setting time a longer time than a setting time, the controller 500 is adapted to shift the current gear range to the N range. In this case, since there is no space to which the gear lever moves beyond the fifth or sixth gear position in the forward or backward direction, the driver can clearly recognize the gear position D at which the neutral parking is possible.

According to the shifting apparatus for a vehicle which has the structure as described above, the neutral parking is made possible only by the movement of the gear lever 100 without the neutral parking button, costs and the number of working processes can be reduced.

Further, it is possible to prevent the neutral parking from being made impossible by damage to the neutral parking button.

In addition, another operating button can be provided at the position at which the neutral parking button is located, it is possible to improve a function and design.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting apparatus for a vehicle comprising:
 a lever position guide that is provided inside a gear lever box at which a gear lever is located, and has a reference position at which the gear lever box is located and multiple gear positions connected to the reference position so as to allow a movement of the gear lever;
 an elastic part that is engaged to the gear lever and the gear lever box and is configured to return the gear lever to the reference position when the gear lever deviates from the reference position and thus is located at any one of the multiple gear positions; and
 a controller that shifts a gear range according to a preset shifting order when the gear lever moves between the reference position and the multiple gear positions, and shifts the gear range to a preset gear range when the gear lever is located at any one of the multiple gear positions for a longer time than a setting time.

2. The shifting apparatus according to claim 1,
 wherein the reference position includes a first reference position and a second reference position, both of which are connected to each other,
 wherein at least one of the gear positions is provided in a forward direction of the first reference position, and
 wherein at least one of the gear positions is provided in a backward direction of the second reference position.

3. The shifting apparatus according to claim 2,
 wherein a first gear position is provided in the forward direction of the first reference position, and a second gear position is provided in the backward direction of the second reference position, and
 wherein the first gear position, the first reference position, the second reference position, and the second gear position are disposed in series from the forward direction to the backward direction.

4. The shifting apparatus according to claim 3, wherein the gear lever is configured to return to the first reference position when moving to the first gear position, and the gear lever is configured to return to the second reference position when moving to the second gear position.

5. The shifting apparatus according to claim 1, wherein the preset shifting order is a reverse range, a neutral range, and a drive range.

6. The shifting apparatus according to claim 2, wherein the controller shifts the gear range to the neutral or reverse range when the gear lever moves in the forward direction, and to the neutral or drive range when the gear lever moves to the backward direction.

7. The shifting apparatus according to claim 1, wherein the preset gear range is a neutral range.

8. The shifting apparatus according to claim 7, further comprising a gear range detector detecting a current gear range of the vehicle, wherein the controller allows the current gear range to be shifted to the neutral range when the detected current gear range is a park range.

9. The shifting apparatus according to claim 7, wherein the controller allows the current gear range to be shifted to the neutral range when a brake signal is applied to the vehicle.

10. The shifting apparatus according to claim 7, wherein the controller allows the current gear range to be shifted to the neutral range only when an engine of the vehicle is cut.

11. The shifting apparatus according to claim 1, wherein the setting time is at least two seconds.

12. The shifting apparatus according to claim 8, wherein the controller shifts the current gear range to the neutral range when the gear lever is located at the gear position farthest from the first reference position in the forward direction.

13. The shifting apparatus according to claim 3, wherein the controller shifts a current gear range to the neutral range when the gear lever is located at the gear position farthest from the second reference position in the backward direction.

14. The shifting apparatus according to claim 7, wherein the gear lever includes an unlock button that is operated to unlock the gear lever so as to allow the movement of the gear lever, and the controller shifts the current gear range to the neutral range when the gear lever is located at any one of the gear positions for a longer time than a setting time in a state in which an unlock signal of the gear lever is applied.

15. The shifting apparatus according to claim 5, wherein the controller shifts a current gear range to the neutral range when the gear lever is located at any one of the gear positions for a longer time than a setting time in the state in which an engine of the vehicle is cut, in which the current gear range is the park range, in which a brake signal is applied, and in which an unlock signal of the gear lever is applied.

* * * * *